(12) United States Patent
Ju et al.

(10) Patent No.: US 8,014,773 B2
(45) Date of Patent: Sep. 6, 2011

(54) MIXED MOBILE COMMUNICATION SYSTEM OF ASYNCHRONOUS COMMUNICATION NETWORK AND SYNCHRONOUS COMMUNICATION NETWORK HAVING HANDOVER FUNCTION OF MOBILE COMMUNICATION TERMINAL, AND HANDOVER METHOD IN THE SAME

(75) Inventors: Jae Young Ju, Gunpo-si (KR);
Sang-Yun Lee, Seongnam-si (KR);
Hee-Hyeok Hahm, Seoul (KR); Soo Jin Kim, Daejeon (KR); Bum-Soo Shin, Seoul (KR); Kyeong-Hee Han, Seoul (KR); Young-Ho Ju, Goyang-si (KR); Hyun Ki Hong, Seoul (KR); Young Ahn Ryu, Gunpo-si (KR)

(73) Assignee: SK Telecom Co., Ltd., Seoul (KR)

( * ) Notice: Subject to any disclaimer, the term of this patent is extended or adjusted under 35 U.S.C. 154(b) by 771 days.

(21) Appl. No.: 11/911,995

(22) PCT Filed: Apr. 19, 2005

(86) PCT No.: PCT/KR2005/001117
§ 371 (c)(1),
(2), (4) Date: May 27, 2008

(87) PCT Pub. No.: WO2006/112561
PCT Pub. Date: Oct. 26, 2006

(65) Prior Publication Data
US 2008/0287131 A1    Nov. 20, 2008

(51) Int. Cl.
*H04W 4/00* (2009.01)
*H04J 3/16* (2006.01)
*H04J 3/00* (2006.01)

(52) U.S. Cl. ........ 455/433; 455/466; 370/466; 370/336

(58) Field of Classification Search .................. 455/439, 455/435.2, 436, 442, 443; 370/331, 310, 370/350, 328
See application file for complete search history.

(56) References Cited

U.S. PATENT DOCUMENTS
6,782,274 B1 * 8/2004 Park et al. ................. 455/552.1
(Continued)

FOREIGN PATENT DOCUMENTS
JP           09-055975        2/1997
(Continued)

OTHER PUBLICATIONS
International Search Report mailed Jan. 19, 2006 for PCT/KR2005/001117.

*Primary Examiner* — Lester Kincaid
*Assistant Examiner* — Kuo Woo
(74) *Attorney, Agent, or Firm* — Lowe Hauptman Ham & Berner LLP

(57) ABSTRACT

In the mobile communication system, asynchronous and synchronous Mobile Switching Centers (MSCs) are interconnected via an Interworking Interoperability Function (IIF), and are connected to a Dual stack Home Location Register (D-HLR). The D-HLR stores and manages asynchronous subscription and synchronous subscription information of the mobile communication terminal. The IIF stores and manages the synchronous mobile communication system information, receives the synchronous subscription information of the mobile communication terminal from the D-HLR, transmits synchronous system information and the synchronous subscription information of the mobile communication terminal to the synchronous MSC and receives a response from the synchronous MSC, and requests the asynchronous MSC to release a wireless connection when the mobile communication terminal and the synchronous mobile communication system are interconnected and notification of completion of the handover is provided.

23 Claims, 18 Drawing Sheets

U.S. PATENT DOCUMENTS

| | | |
|---|---|---|
| 6,912,389 B2 * | 6/2005 | Bright et al. .................. 455/433 |
| 7,443,881 B2 * | 10/2008 | Park et al. ..................... 370/466 |
| 2005/0159158 A1 * | 7/2005 | Pardeep et al. ............... 455/436 |

FOREIGN PATENT DOCUMENTS

| | | |
|---|---|---|
| JP | 11-205842 | 7/1999 |
| JP | 2001-045535 | 2/2001 |
| JP | 2001-186552 | 7/2001 |
| JP | 2001-186552 A | 7/2001 |
| JP | 2001-197539 | 7/2001 |
| JP | 2001-224052 | 8/2001 |
| JP | 2001-224052 A | 8/2001 |
| JP | 2003-078969 | 3/2003 |
| JP | 03/050976 | 6/2003 |
| JP | 2004/068768 | 8/2004 |
| JP | 2004-248291 | 9/2004 |
| KR | 2005-77196 A | 8/2005 |

* cited by examiner

FIG. 8

| Relocation Required | | | | | |
|---|---|---|---|---|---|
| Parameter name | Type | Range | Reference | Content and purpose | Assigned Criticality |
| Message Type | M | | | Relocation Preparation | reject |
| Relocation Type | M | | | UE-involved/not involved In the case of UE-related relation, UTRAN must notify UE of relation | reject |
| Cause | M | | | Cause to perform relocation | ignore |
| Source ID | M | | | Global RNC-ID of Source RNC as a Source RNC ID | ignore |
| Target ID | M | | | Target RNC ID including RNC ID and LAI | reject |
| Source RNC To Target RNC Transparent Container | C– if UMTS target | | | Information that Source RNC carries to Target RNC, including set RAB information and radio section-related information | reject |

FIG. 9

| MAP_PREPARE_HANDOVER | | | | |
|---|---|---|---|---|
| Parameter name | Request | Indication | Response | Confirm |
| Invoke Id | M | M(=) | M(=) | M(=) |
| Target Cell Id | C | C(=) | | |
| Target RNC Id | C | C(=) | | |
| HO-NumberNotRequired | C | C(=) | | |
| IMSI | C | C(=) | | |
| MSISDN | C | C(=) | | |
| Integrity Protection Information | C | C(=) | | |
| Encryption Information | C | C(=) | | |
| Radio Resource Information | C | C(=) | | |
| AN-APDU | C | C(=) | C | C(=) |
| Allowed GSM Algorithms | C | C(=) | | |
| Allowed UMTS Algorithms | C | C(=) | | |
| Radio Resource List | C | C(=) | | |
| RAB ID | C | C(=) | | |
| BSSMAP Service Handover | C | C(=) | | |
| BSSMAP Service Handover List | C | C(=) | | |
| RANAP Service Handover | C | C(=) | | |
| ASCI Call Reference | C | C(=) | | |
| Handover Number | | | C | C(=) |
| Relocation Number List | | | C | C(=) |
| Multicall Bearer Information | | | C | C(=) |
| Multiple Bearer Requested | C | C(=) | | |
| Multiple Bearer Not Supported | | | C | C(=) |
| Selected UMTS Algorithms | | | C | C(=) |
| Chosen Radio Resource Information | | | C | C(=) |
| User error | | | C | C(=) |
| Provider error | | | | O |

FIG. 10A

| CallDataRequest | Timer=CDRTT | Class=1 | Code=00010101(H'15) | |
|---|---|---|---|---|
| Request Parameter | | Type | Reference | Notes |
| BillingID | | M | 6.5.2.16 | |
| Digits(Dialed) | | M | 6.5.2.58 | |
| MSCID(Originating) | | M | 6.5.2.82 | |
| SystemMyTypeCode(Originating) | | M | 6.5.2.147 | |
| UsageIndicator | | M | 6.5.2.164 | |
| PC_SSN(MSC-H or MSC-G) | | O | 6.5.2.93 | |
| Return result parameter | | Type | Reference | Notes |
| ElectronicSerialNumber | | M | 6.5.2.63 | |
| MobileIdentificationNumber | | M | 6.5.2.81 | |
| MSCID(Serving) | | M | 6.5.2.82 | |
| SystemMyTypeCode(Serving) | | M | 6.5.2.147 | |
| PC_SSN(Serving MSC) | | O | 6.5.2.93 | |

FIG. 10B

| MAP SEND IMSI | | | | |
|---|---|---|---|---|
| Parameter name | Request | Indication | Response | Confirm |
| Invoke Id | M | M(=) | M(=) | M(=) |
| MSISDN | M | M(=) | | |
| IMSI | | | C | C(=) |
| MIN | | | C | C(=) |
| ESN | | | C | C(=) |
| User error | | | C | C(=) |
| Provider error | | | | O |

FIG. 11

| FacilitiesDirective2 | Timer=HOT | class=1 | Code =00100100(H"24) | |
|---|---|---|---|---|
| Request parameter | | Type | Reference | Notes |
| BillingID | | M | 6.5.2.16 | |
| ElectronicSerialNumber | | M | 6.5.2.63 | |
| InterMSCCircuitID | | M | 6.5.2.72 | |
| InterSwitchCount | | M | 6.5.2.73 | |
| MobileIdentificationNumber | | M | 6.5.2.81 | |
| ServingCellID | | M | 6.5.2.117 | |
| CDMACallMode | | O | 6.5.2.29 | |
| CDMAChannelData (Serving) | | O | 6.5.2.30 | |
| CDMAMobileProtocolRevision | | O | 6.5.2.34 | |
| CDMAPrivateLongCodeMask | | O | 6.5.2.36 | |
| CDMAServingOneWayDelay | | O | 6.5.2.38 | |
| CDMAStationClassMark | | O | 6.5.2.41 | |
| CDMATargetMAHOList | | O | 6.5.2.43 | |
| CDMATargetMeasurementList | | O | 6.5.2.45 | |
| ConfidentialityModes (Desired) | | O | 6.5.2.50 | |
| HandoffReason | | O | 6.5.2.70 | |
| HandoffState | | O | 6.5.2.71 | |
| MSLocation | | O | 6.5.2.84 | |
| SignalingMessageEncryptionKey | | O | 6.5.2.120 | |
| VoicePrivacyMask | | O | 6.5.2.167 | |
| Return result parameter | | Type | Reference | Notes |
| CDMAChannelData (Target) | | O | 6.5.2.30 | |
| CDMACodeChannelList | | O | 6.5.2.33 | |
| CDMASearchWindow | | O | 6.5.2.37 | |
| ConfidentialityModes (Actual) | | O | 6.5.2.50 | |

FIG. 12

| Relocation Command | | | | | |
|---|---|---|---|---|---|
| Parameter name | Type | Range | Reference | Content and purpose | Assigned Criticality |
| Message Type | M | | | Relocation Preparation | reject |
| Source RNC To Target RNC Transparent Container | O | | | Transmit RRC container, which is received from Target RNC, to Source RNC via Relocation Request Ack message | reject |
| L3 Information | O | | | | ignore |
| RABs TO Be Released List | O | | | Include RAB list to be released | ignore |
| >RABs To Be Released Item IEs | | 1 to 7 | | | ignore |
| >>RAB ID | M | | | Same RAB ID must appear in only single group. | |
| Criticality Diagnostics | O | | | Information about error in Relocation required message | ignore |

FIG. 13

| MAP_PROCESS_ACCESS_SIGNALLING | | |
|---|---|---|
| Parameter name | Request | Indication |
| Invoke Id | M | M(=) |
| AN-APDU | M | M(=) |
| Selected GSM Algorithm | C | C(=) |
| Selected UMTS Algorithms | C | C(=) |
| Chosen Radio Resource Information | C | C(=) |
| Selected RAB id | C | C(=) |

FIG. 14

| MobileOnChannel | Timer=none | Class=1 | Code=00000011(H'03) | |
|---|---|---|---|---|
| Request parameter | | Type | Reference | Notes |
| Vacant | | | | |

FIG. 15

| MAP_SEND_END_SIGNAL | | | | |
|---|---|---|---|---|
| Parameter name | Request | Indication | Response | Confirm |
| Invoke Id | M | M(=) | M(=) | M(=) |
| AN-APDU | M | M(=) | | |
| Provider error | | | | O |

FIG. 16

| Iu Release Command | | | | | |
|---|---|---|---|---|---|
| Parameter name | Type | Range | Reference | Content and purpose | Assigned Criticality |
| Message Type | M | | | Iu Release | reject |
| Cause | M | | | Release cause | ignore |

FIG. 17

| Iu Release Complete | | | | | |
|---|---|---|---|---|---|
| Parameter name | Type | Range | Reference | Content and purpose | Assigned Criticality |
| Message Type | M | | | Iu Release | reject |
| Criticality Diagnostics | O | | | Iu Release Command Information about error in message | ignore |

FIG. 18

| FacilitiesRelease | Timer=CTT | Class=1 | Code =00000101(H'05) | |
|---|---|---|---|---|
| Request Parameter | | Type | Reference | Notes |
| InterMSCCircuitID | | M | 6.5.2.72 | |
| ReleaseReason | | M | 6.5.2.111 | |
| BillingID | | O | 6.5.2.16 | |
| MobileIdentificationNumber | | O | 6.5.2.81 | |
| Return result parameter | | Type | Reference | Notes |
| BillingID | | O | 6.5.2.30 | |

FIG. 19

| MAP-PREPARE-HANDOVER | | | | |
|---|---|---|---|---|
| Parameter name | Request | Indication | Response | Confirm |
| Invoke Id | M | M(=) | M(=) | M(=) |
| Target Cell Id | C | C(=) | | |
| Target RNC Id | C | C(=) | | |
| HO-NumberNotRequired | C | C(=) | | |
| IMSI | C | C(=) | | |
| MSISDN | C | C(=) | | |
| Integrity Protection Information | C | C(=) | | |
| Encryption Information | C | C(=) | | |
| Radio Resource Information | C | C(=) | | |
| AN-APDU | C | C(=) | C | C(=) |
| Allowed GSM Algorithms | C | C(=) | | |
| Allowed UMTS Algorithms | C | C(=) | | |
| Radio Resource List | C | C(=) | | |
| RAB ID | C | C(=) | | |
| BSSMAP Service Handover | C | C(=) | | |
| BSSMAP Service Handover List | C | C(=) | | |
| RANAP Service Handover | C | C(=) | | |
| ASCI Call Reference | C | C(=) | | |
| Handover Number | | | C | C(=) |
| Relocation Number List | | | C | C(=) |
| Multicall Bearer Information | | | C | C(=) |
| Multiple Bearer Requested | C | C(=) | | |
| Multiple Bearer Not Supported | | | C | C(=) |
| Selected UMTS Algorithms | | | C | C(=) |
| Chosen Radio Resource Information | | | C | C(=) |
| User error | | | C | C(=) |
| Provider error | | | | O |
| CDMACellMode | | | | |

FIG. 20

| IntersystemAnswer | | Timer=ISAT | Class =1 | Code =00101100(H'2C) | |
|---|---|---|---|---|---|
| Request Parameter | | | Type | Reference | Notes |
| InterMSCCircuitID | | | M | 6.5.2.72 | |
| MobileIdentificationNumber | | | M | 6.5.2.81 | |
| ElectronicSerialNumber | | | O | 6.5.2.63 | |
| Return result parameter | | | Type | Reference | Notes |
| Vacant | | | | | |

MIXED MOBILE COMMUNICATION SYSTEM OF ASYNCHRONOUS COMMUNICATION NETWORK AND SYNCHRONOUS COMMUNICATION NETWORK HAVING HANDOVER FUNCTION OF MOBILE COMMUNICATION TERMINAL, AND HANDOVER METHOD IN THE SAME

CROSS REFERENCE TO RELATED APPLICATION

This application is the National Phase application of International Application No. PCT/KR2005/001117, filed Apr. 19, 2005, which designates the United States and was published in English. This application, in its entirety, is incorporated herein by reference.

TECHNICAL FIELD

The present invention relates, in general, to a handover method in a mobile communication network and, more particularly, to a mobile communication system in which asynchronous and synchronous networks, between which the handover of a communication terminal can be performed, coexist, and a handover method using an Interworking Interoperability Function, which is used to exchange signals between asynchronous and synchronous MSCs in the mobile communication system.

BACKGROUND ART

With the development of mobile communication technology, mobile communication networks are evolving generation by generation. Currently, a mobile communication network has a form in which a synchronous mobile communication system (CDMA mobile communication system), called a 2nd or 2.5th generation network, and an asynchronous mobile communication system (WCDMA mobile communication system), called a 3rd generation network, coexist.

With the development of such mobile communication network technology, a mobile communication terminal (Dual Band Dual Mode Terminal; DBDM mobile communication terminal), capable of being used both in a synchronous type system and in an asynchronous type system, is being developed. Using such a mobile communication terminal, different types of services can be used in the respective areas of an asynchronous type system and a synchronous type system. Such a DBDM mobile communication terminal includes an antenna, a synchronous modem unit for performing synchronous mobile communication, an asynchronous modem unit for performing asynchronous mobile communication, and a common module.

Meanwhile, since the asynchronous mobile communication system is at an early stage of service and cannot provide service over a wide area due to the massive investment cost for the implementation of the system, the asynchronous mobile communication system is implemented to overlap the area of a synchronous mobile communication system. As a result, the service area of the asynchronous mobile communication system is limited, so there is a problem in that a call is disconnected in the case where subscribers to the asynchronous mobile communication system move to a synchronous area, in which an asynchronous mobile communication service is not provided, while using a service in an asynchronous area.

As described above, in the case where an asynchronous mobile communication system and a synchronous mobile communication system coexist and the area of the asynchronous mobile communication system is smaller than that of the synchronous mobile communication system, handover is required to provide continuous service between the asynchronous and synchronous mobile communication systems. Furthermore, such handover needs to be supported during the use of the voice communication service of a mobile communication terminal or a reception alerting state, or while waiting for the response of a called party after the origination of a call.

DISCLOSURE OF THE INVENTION

The present invention has been made keeping in mind the above problems occurring in the prior art, and an object of the present invention is to provide a handover method that can provide continuous service without the disconnection of a call using an Interworking Interconnection Function between asynchronous and synchronous MSCs as a mobile communication terminal moves from the area of an asynchronous mobile communication system to the area of a synchronous mobile communication system.

Another object of the present invention is to provide a handover method that, when a radio network controller requests handover from an asynchronous MSC, the asynchronous MSC determines whether the requested handover is handover within an asynchronous mobile communication system or handover to a synchronous mobile communication system and performs a handover process appropriate for the handover target, as a mobile communication terminal located in the area of the asynchronous mobile communication system moves to the area of the synchronous mobile communication system.

Still another object of the present invention is to provide a handover method that enables handover to the area of a synchronous mobile communication system while a mobile communication terminal uses service in the area of an asynchronous mobile communication system, is in a reception alerting state, or is in a state of waiting for a response from a called party after the origination of a call.

BRIEF DESCRIPTION OF THE DRAWINGS

FIGS. 8 to 20 are diagrams illustrating parameters included in messages necessary for the handover methods of the present invention.

BEST MODE FOR CARRYING OUT THE INVENTION

In order to achieve the above-described objects, the present invention provides a mobile communication system in which an asynchronous mobile communication system, including a node B, a radio network controller and an asynchronous Mobile Switching Center (MSC), and a synchronous mobile communication system, including a Base Transceiver Station (BTS), a Base Station Controller (BSC) and a synchronous MSC, coexist, the mobile communication system enabling handover of a Dual Band Dual Mode (DBDM) mobile communication terminal, capable of communicating with the asynchronous and synchronous systems, during voice communication, or reception alerting, or while waiting for a response after origination of a call, wherein the asynchronous and synchronous MSCs are connected to each other via an Interworking Interoperability Function (IIF), and are connected to a Dual stack Home Location Register (D-HLR); the D-HLR stores and manages asynchronous subscription and synchronous subscription information of the mobile communication terminal; and the IIF stores and manages the synchronous mobile communication system information, receives the synchronous subscription information of the mobile communication terminal from the D-HLR at a request of the asynchronous MSC for handover, transmits the synchronous system information and the synchronous subscription information of the mobile communication terminal to the synchronous MSC and receives a response from the synchronous MSC, thereby setting up a relay line between the asynchronous MSC and the synchronous MSC, and requests the asynchronous MSC to release a wireless connection when the mobile communication terminal and the synchronous mobile communication system are connected to each other and notification of completion of the handover is provided by the synchronous MSC.

Preferred embodiments of the present invention are described in more detail with reference to the accompanying drawings below.

Figure 1:
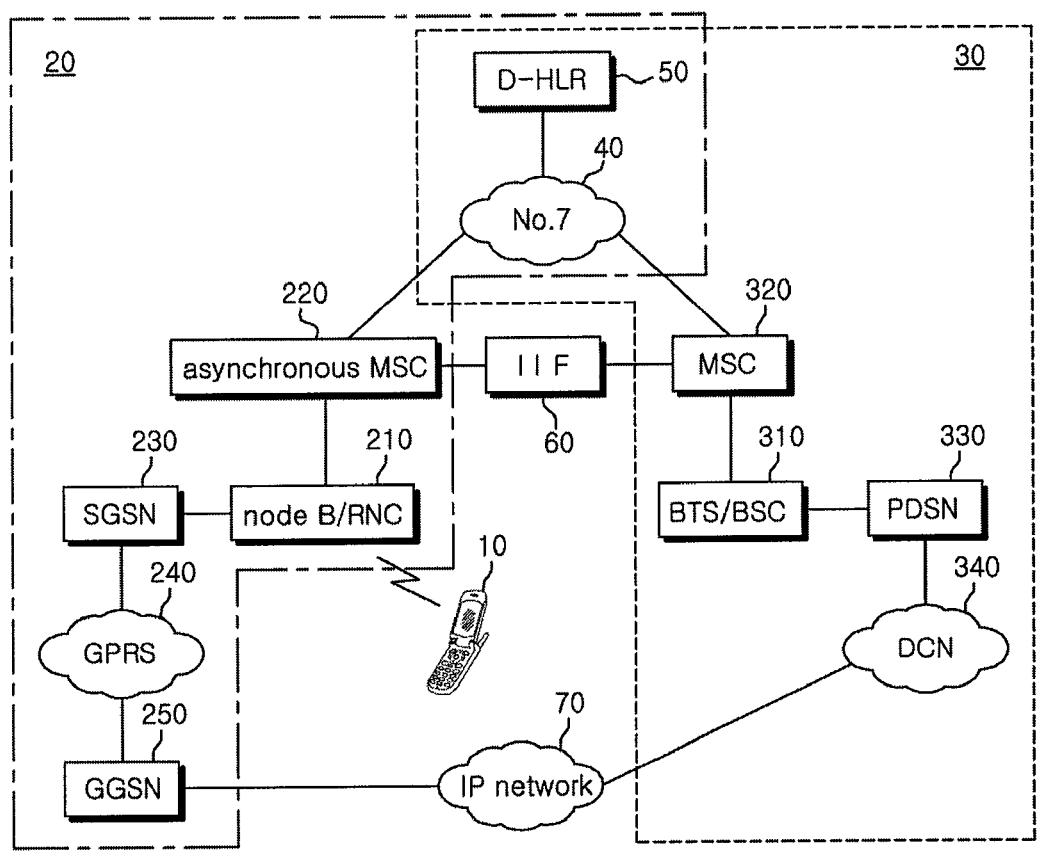
FIG. 1 is a diagram illustrating the construction of a mobile communication network to which the present invention is applied.

FIG. 1 is a diagram illustrating the construction of a mobile communication network to which the present invention is applied.

A mobile communication terminal 10 to which the present invention is applied is a Dual Band Dual Mode (hereinafter referred to as a 'DBDM mobile communication terminal'), and has a structure capable of providing both asynchronous mobile communication service and synchronous mobile communication service. The mobile communication terminal 10 includes a synchronous modem unit which is a module for synchronous mobile communication, an asynchronous modem unit which is a module for asynchronous mobile communication, and a common module, so that it wirelessly connects to each of an asynchronous mobile communication system 20 and a synchronous mobile communication system 30 and can use voice and data services.

An asynchronous mobile communication system 20 includes a node B/RNC 210 configured to include a node B, that is, a base station for performing radio section communication with the mobile communication terminal 10 and a Radio Network Controller (RNC) for controlling the node B, an asynchronous Mobile Switching Center (USC) 220 connected to the RNC 210 and configured to perform call exchange to provide service to the mobile communication terminal 10, a Serving General Packet Radio Service (GPRS) Support Node (SGSN) 230 connected between the RNC and a GPRS network 240 and configured to maintain the location track of the mobile communication terminal 10 and perform access control and a security function, and a Gateway GPRS Support Node (GGSN) 250 connected to the SGSN 230 via the GPRS network 240, and connected to an Internet Protocol (IP) network 70 to support interworking with external packets.

Furthermore, a synchronous mobile communication system 30 includes a Base Transceiver Station (BTS)/Base Station Controller (BSC) 310 configured to include a BTS for supporting radio section communication with the mobile communication terminal 10 and a BSC for controlling the BTS, an MSC 320 connected to one or more BSCs and configured to support call exchange, a Packet Data Service Node (PDSN) 330 connected to the BSC and configured to provide packet data service to subscribers, and a Data Core Network 340 configured to support the connection between the PDSN 330 and the IP network 70.

Furthermore, the MSCs 220 and 320 of the asynchronous mobile communication system 20 and synchronous mobile communication system 30 are interconnected via an Interworking Interoperability Function (IIF) 60, and the IIF 60 converts an asynchronous message, which is transmitted from the asynchronous MSC 220, into a synchronous message, transmits the synchronous message to the synchronous MSC 320, and stores and manages information about the synchronous mobile communication system in a database.

The asynchronous MSC 220 and the synchronous MSC 320 are connected to a No. 7 common signal network 40, and connect to a Dual stack Home Location Register (D-HLR) 50 via the No. 7 common signal network 40. The D-HLR 50 stores and manages information about the subscription of the DBDM mobile communication terminal 10 to the asynchronous mobile communication system and information about the corresponding subscription to the synchronous mobile communication system, so that the asynchronous and synchronous MSCs 220 and 320 can refer to the information when performing service, such as handover.

In the above-described network configuration, the mobile communication ter 10 located in the area of the asynchronous mobile communication system 20 periodically measures the strength of a signal from the node B, and reports the measured strength to the node B. When the strength of the signal from the node B decreases to or below a preset threshold value, the node B reports the occurrence of a handover event to the asynchronous MSC 220 via the RNC. In this case, the node B/RNC 210 transmits neighborhood cell information and a BTS ID detected by the mobile communication terminal 10, along with the information about the occurrence of the handover event, to the asynchronous MSC 220. At this time, the mobile communication terminal 10 may be in the state of using a voice communication service, in a reception alerting state, or in the state of waiting for a response from a receiving side after the origination of a call.

When the asynchronous MSC 220 receives a handover request message from the RNC, it determines whether the requested handover is handover between neighborhood cells of the asynchronous mobile communication system 20 or handover to the synchronous mobile communication system 30 with reference to the information about adjacent cells and BTS IDs, which are received from the RNC.

In the case of handover between cells of the asynchronous mobile communication system 20, the asynchronous MSC 220 performs handover to a neighborhood cell, while in the case of handover to the synchronous mobile communication system 30, it performs handover to the synchronous MSC 320 via the IIF 60. For this purpose, the IIF 60 converts an asynchronous message into a synchronous message and transmits it to the synchronous MSC 320, and it must store and manage information about the synchronous mobile communication system in a database. This database includes MSC information, signaling points, and dedicated channel-related relay line information. The IIF 60 selects a handover target MSC 320 based on the request of the asynchronous MSC 220 for handover and the information about the synchronous mobile communication system, creates a billing ID including the ID of the handover target MSC, and then uses the billing ID in later handover processes.

The handover process in the mobile communication system is described for the cases in which the mobile communication terminal is in the state of using a voice communication service, in a reception alerting state, or in the state of waiting for a response from a receiving side after the origination of a call.

Figure 2:
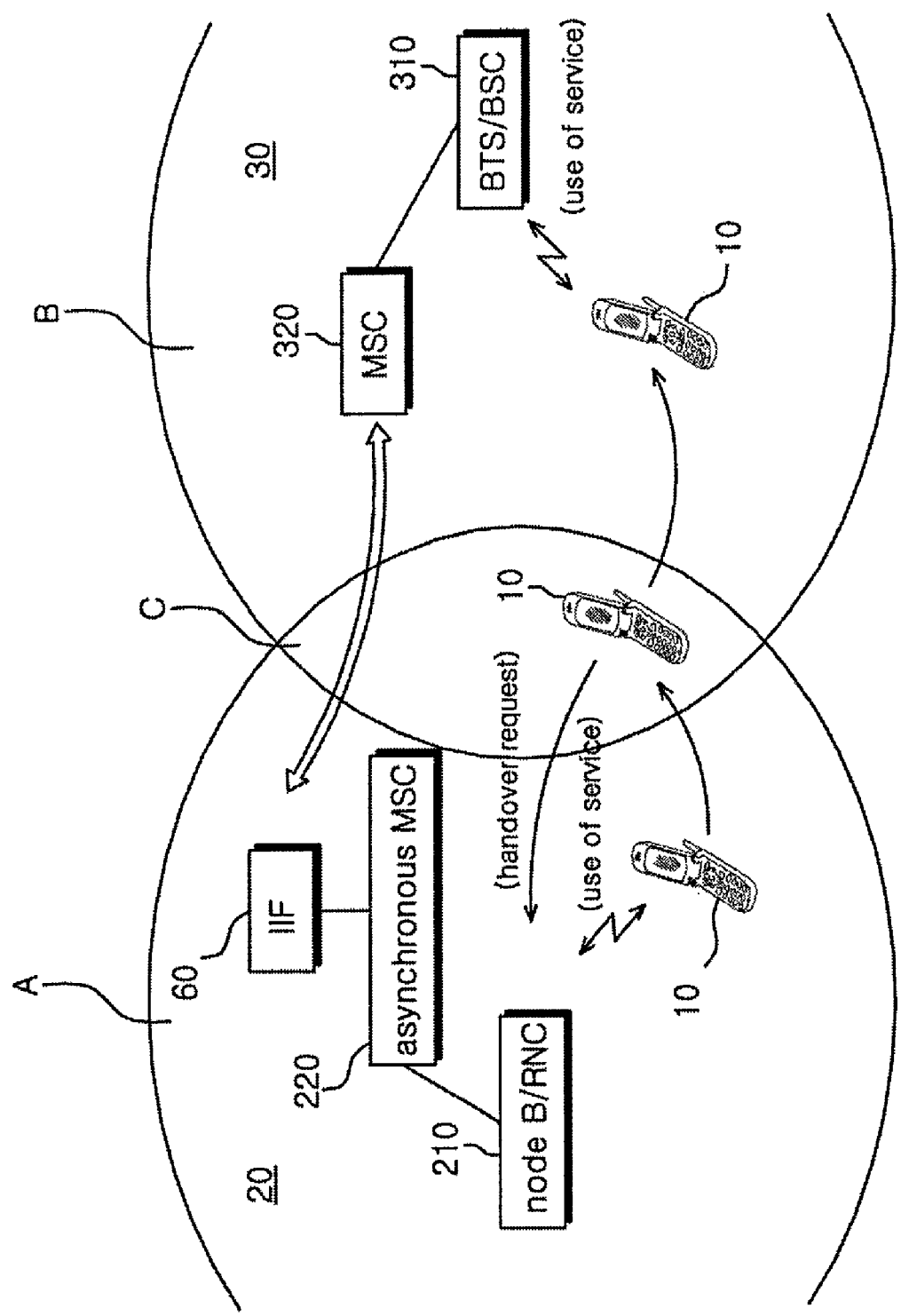
FIGS. 2 and 3 are a conceptual diagram and a flowchart, respectively, illustrating a method of handover between asynchronous and synchronous networks according to an embodiment of the present invention.
Figure 3:
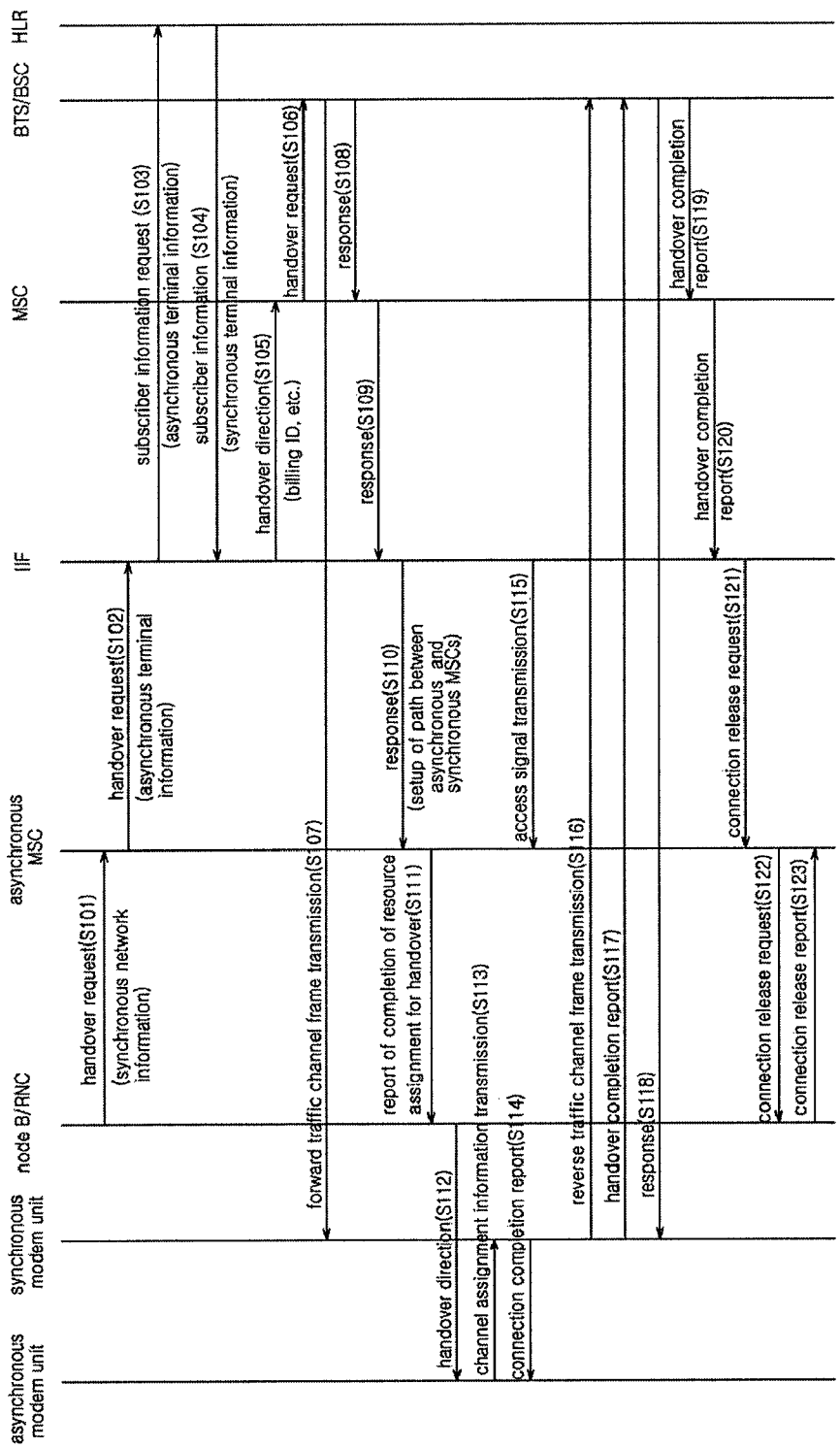

FIGS. 2 and 3 are a conceptual diagram and a flowchart, respectively, illustrating a method of handover between asynchronous and synchronous networks according to an embodiment of the present invention. The diagrams illustrate a handover method in the case where a mobile communication terminal moves to the area of a synchronous mobile communication system while using voice communication service in the area of an asynchronous mobile communication system.

Referring to FIG. 2, the mobile communication terminal 10 that uses voice communication service in the area A of the asynchronous mobile communication system 20 periodically measures the strength of a signal from the currently connected node B or the strength of a signal from an adjacent BTS or node B, and reports the measured strength to the node B. As the mobile communication terminal 10 moves to an area C overlapping the area B of the synchronous mobile communication system 30, the node B requests handover from the asynchronous MSC 220 via the RNC if the strength of the signal measured by the mobile communication terminal 10 is equal to or lower than a predetermined value.

Accordingly, a process of handover of the mobile communication terminal 10 between the asynchronous mobile communication system 20 and the synchronous mobile communication system 30 is initiated via the IIF 60. When the handover is completed and the asynchronous MSC 220 and the synchronous MSC 320 connect to each other via the IIF 60, the mobile communication terminal 10 continuously uses the voice communication service via the BTS/BSC 310 of the synchronous mobile communication system 30.

For the above-described handover during the use of the voice communication service, the mobile communication terminal 10 periodically measures the strength of a signal from the node B and reports the measured strength to the node B. When the strength of the signal from the node B decreases to or below the preset threshold value, the node B reports the occurrence of a handover event to the asynchronous MSC 220 via the RNC. In this case, the node B/RNC 210 transmits neighborhood cell information and a BTS ID detected by the mobile communication terminal 10, along with the information about the occurrence of the handover event, to the asynchronous MSC 220.

The process of handover during the use of the voice communication service is described in more detail with reference to FIG. 3 below.

As the mobile communication terminal 10 that is using the voice communication service in the area of the asynchronous mobile communication system 20 moves to the area of the synchronous mobile communication system 30, the mobile communication terminal 10 detects a signal from the synchronous mobile communication system 30, periodically measures the strength of a signal from the node B of the asynchronous mobile communication system 20 or the strength of a signal from an adjacent BTS or node B, and reports the measured strength to the node B. Accordingly, if the node B currently connected to the mobile communication terminal 10 determines that the strength of the signal between the mobile communication terminal and the node B is equal to or lower than a predetermined value, the node B requests handover from the asynchronous MSC 220 via the RNC (using IU Reloc Required) at step S101.

The handover request message (IU Reloc Required) includes a handover-related message used in the synchronous mobile communication system. The RNC transmits the adjacent BTS information (BTS ID) and the adjacent cell information received from the mobile communication terminal 10, and the asynchronous MSC 220 determines whether the requested handover is handover between adjacent cells of the asynchronous mobile communication system or handover to the synchronous mobile communication system 30 based on the information. The handover request message (IU Reloc Required) transmitted by the RNC to the asynchronous MSC 220, as illustrated in FIG. 8, includes parameters such as a message type, a handover type, a handover cause, a source BSC ID, a target BSC ID, Radio Access Bearer (RAB) information and radio section-related information.

The asynchronous MSC 220, having received the handover request message, transits an asynchronous message requesting handover to the IIF 60 (using MAP Prep Handover Req) at step S102. In this case, an extension container is added to the asynchronous message, and the asynchronous ID number MSISDN of the mobile communication terminal 10 is transmitted along with the asynchronous message. This message, as illustrated in FIG. 9, includes parameters such as an invoke ID, a target cell ID, a target RNC ID, and MSISDN.

Thereafter, the IIF 60 requests the D-HLR 50 to transmit subscriber information with reference to the asynchronous subscriber information MSISDN received from the asynchronous MSC 220 (using Call Data Request) at step S103. That is, the synchronous network identifiers MIN (Mobile Identification Number) and ESN (Electronic Serial Number) of the mobile communication terminal 10 are requested. At step S103, the IIF 60 may request the synchronous network identifier information of a subscriber from the D-HLR 50 using an asynchronous message MAP_SEND_IMSI).

The D-HLR 50, having received the subscriber information request from the IIF 60, searches the database, extracts the synchronous network identifier information MIN, ESN of the corresponding subscriber, and transmits the information to the IIF 60 (using Call Data Req Ack) at step S104. The IIF 60, having received the information, directs the synchronous MSC 320 to perform handover (using Facilities Directive2) at step S105, and the synchronous MSC 320 requests handover from the BSC/BTS 310 (using Handoff Request) at step S106. In this case, as illustrated in FIG. 10a, a synchronous network message (Call Data Request) requesting the synchronous network identifier information of the subscriber includes parameters, such as a billing ID and a digit (that is, MSISDN), and its response message (Call Data Req Ack) includes parameters such as ESN, MIN and MSCID.

Meanwhile, in the case of using an asynchronous message (MAP_SEND_IMSI) when requesting the synchronous network identifier information of a subscriber, the types of parameters included in the message are illustrated in FIG. 10B.

As described above, before transmitting a handover direction message (Facilities Directive2) to the synchronous MSC 320, the IIF 60 creates a billing ID, includes the billing ID in the handover direction message (Facilities Directive2), and transmits the handover direction message (Facilities Directive2) with an internal MSC circuit ID (InterMSCCircuitID) included therein for each handover section. In this case, the billing ID includes the ID information of the synchronous MSC 320 to be connected to the asynchronous MSC 220. The BTS/BSC 310, having received the handover request from the MSC 320, transmits a NULL frame to the synchronous modem unit of the mobile communication terminal via a forward traffic channel, so that a forward channel is assigned at step S107. Thereafter, the BTS/BSC 310 transmits a response message (Handoff Request Ack) for the handover request to the MSC 320 at step S108. Furthermore, the MSC 320 transmits a response message (Facilities Directive2 Ack) for the handover direction to the IIF 60 at step S109, and the IIF 60 transmits a response message (MAP Prep Handover Resp) for the handover request of step S102 to the asynchronous MSC 220 at step S110. Accordingly, a relay line is set up between the asynchronous MSC 220 and the synchronous MSC 320.

The process of setting up the relay line between the asynchronous MSC 220 and the synchronous MSC 320 is described in more detail in the following. The IIF 60 sets up a mapping relationship between a dedicated channel and a physical relay line, that is, a logical relay line setup identifier, sets this information as the internal MSC circuit ID (InterMSCCircuitID) of the handover request message (Facilities Directive2), and transmits the set information to the synchronous MSC 320. When the response message (Facilities Directive2 Ack) is transmitted from the synchronous MSC 320, the relay line is set up between the asynchronous MSC 220 and the synchronous MSC 320. The handover request message (Facilities Directive2) transmitted and received between the IIF 60 and the synchronous MSC 320, as illustrated in FIG. 11, includes parameters such as a billing ID, ESN, an internal MSC circuit ID, and MIN, and its response message (Facilities Directive2 Ack) includes parameters such as CDMA channel data and a CDMA channel list.

After the relay line has been set up between the MSCs as described above, the asynchronous MSC 220 reports the completion of the assignment of resources for handover to the node B/RNC 210 (using IU Relocation Command) at step S111. The node B/RNC 210, having received the report, requests the asynchronous modem unit of the mobile communication terminal 10 to perform handover (using Handover from UTRAN Command) at step S112. In this case, the message (IU Relocation Command) reporting the completion of the assignment of resources, as illustrated in FIG. 12, includes parameters such as a message type, an RRC container, and an RAB list to be released.

Thereafter, the asynchronous modem unit of the mobile communication terminal transmits channel assignment information to the synchronous modem unit (using Channel Assignment) at step S113, and the synchronous modem unit reports the completion of the connection to the synchronous mobile communication system to the asynchronous modem unit (using Call Connection) at step S114. Thereafter, the IIF 60 requests an access signal from the asynchronous MSC 220 (using MAP Process Access Signaling Req) at step S115. The access signal includes an invoke ID, an application protocol data unit APDU and selected wireless resource information. The detailed parameter list is illustrated in FIG. 13.

Furthermore, the synchronous modem unit of the mobile communication terminal transmits frames and a preamble (Reverse Traffic Channel Frames or Traffic Channel Preamble) to the BTS/BSC 310 of the synchronous mobile communication system via a reverse traffic channel at step S116, and reports the completion of the handover to the BTS/BSC 310 (using Handoff Completion Message) at step S117. The BTS/BSC 310 transmits a response signal for the report (using BS Ack Order) at step S118.

The BTS/BSC 310 reports the completion of the handover to the MSC 320 (using Handoff Complete) at step S119, the MSC 320 reports the completion of the handover to the IIF 60 (using Mobile On Channel) at step S120, and the IIF 60, having received the report, requests the asynchronous MSC 220 to release the connection (using MAP Send End Signal Req) at step S121, so that the connection between the asynchronous MSC 220 and the node B/RNC is released (using IU Release Command, IU Release Complete) at steps S122 and S123.

In this case, the handover completion message (Mobile On Channel), which is transmitted by the MSC 320 to the IIF 60, is constructed as illustrated in FIG. 14, and the connection release request message (MAP Send End Signal Req), which is transmitted by the IIF 60 to the asynchronous MSC 220, includes parameters illustrated in FIG. 15. Meanwhile, the messages (IU Release Command and IU Release Complete), which are transmitted and received between the asynchronous MSC 220 and the node B/RNC for release of the connection, are constructed as illustrated in FIGS. 16 and 17.

A process of releasing a call after the completion of the handover of a mobile communication terminal, which was performing voice communication in the asynchronous mobile communication system, to the synchronous mobile communication system according to the above-described process is as follows. The call release may be requested by a subscriber's mobile communication terminal located in the area of the asynchronous mobile communication system, or by a subscriber's mobile communication terminal that was handed over to the area of the synchronous mobile communication system.

Although the call release request can be received from any party, the MSC 220 or 320, having received the call release request, transmits a call release request message (Facilities Release) to the IIF 60, and the IIF 60 responds to the call release request message (using Facilities Ack), so that a relay line set up between the MSCs is released. In this case, the call release request message (Facilities Release), as illustrated in FIG. 18, includes parameters, such as an internal MSC circuit ID, a release cause, a billing ID, and MIN, and its response message (Facilities Ack) includes parameters such as a billing ID.

In the present embodiment, the asynchronous MSC determines whether the requested handover is handover within the asynchronous mobile communication system or handover to the synchronous mobile communication system based on the handover request of the RNC. If it is determined that the requested handover is handover to the synchronous mobile communication system, messages are exchanged with the MSC of the synchronous mobile communication system using the IIF as a converter so as to accomplish the handover. For this purpose, the IIF must previously store information about the synchronous mobile communication system in a database.

Figure 4:
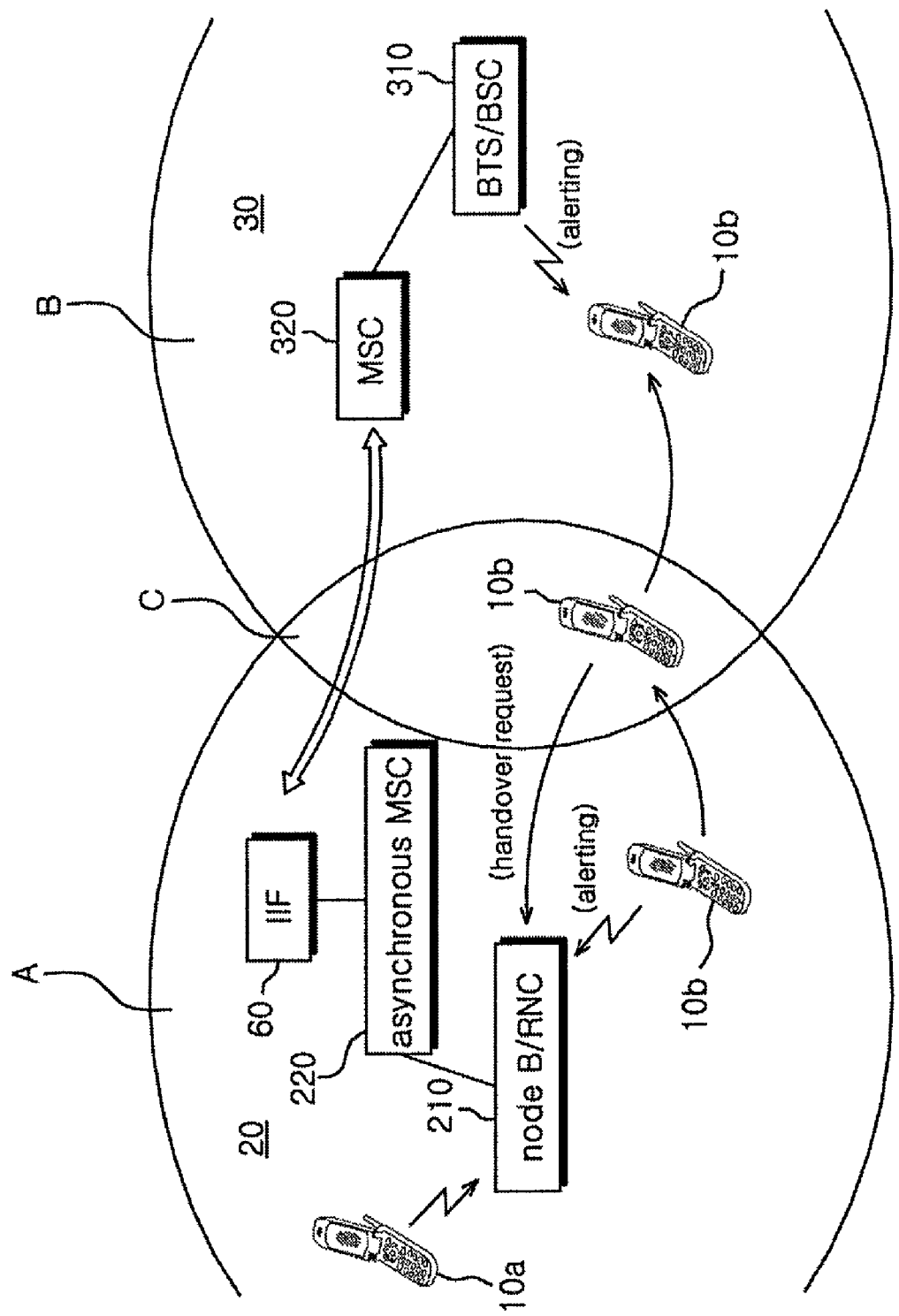
FIGS. 4 and 5 are a conceptual diagram and a flowchart, respectively, illustrating a method of handover between asynchronous and synchronous networks according to another embodiment of the present invention.
Figure 5:
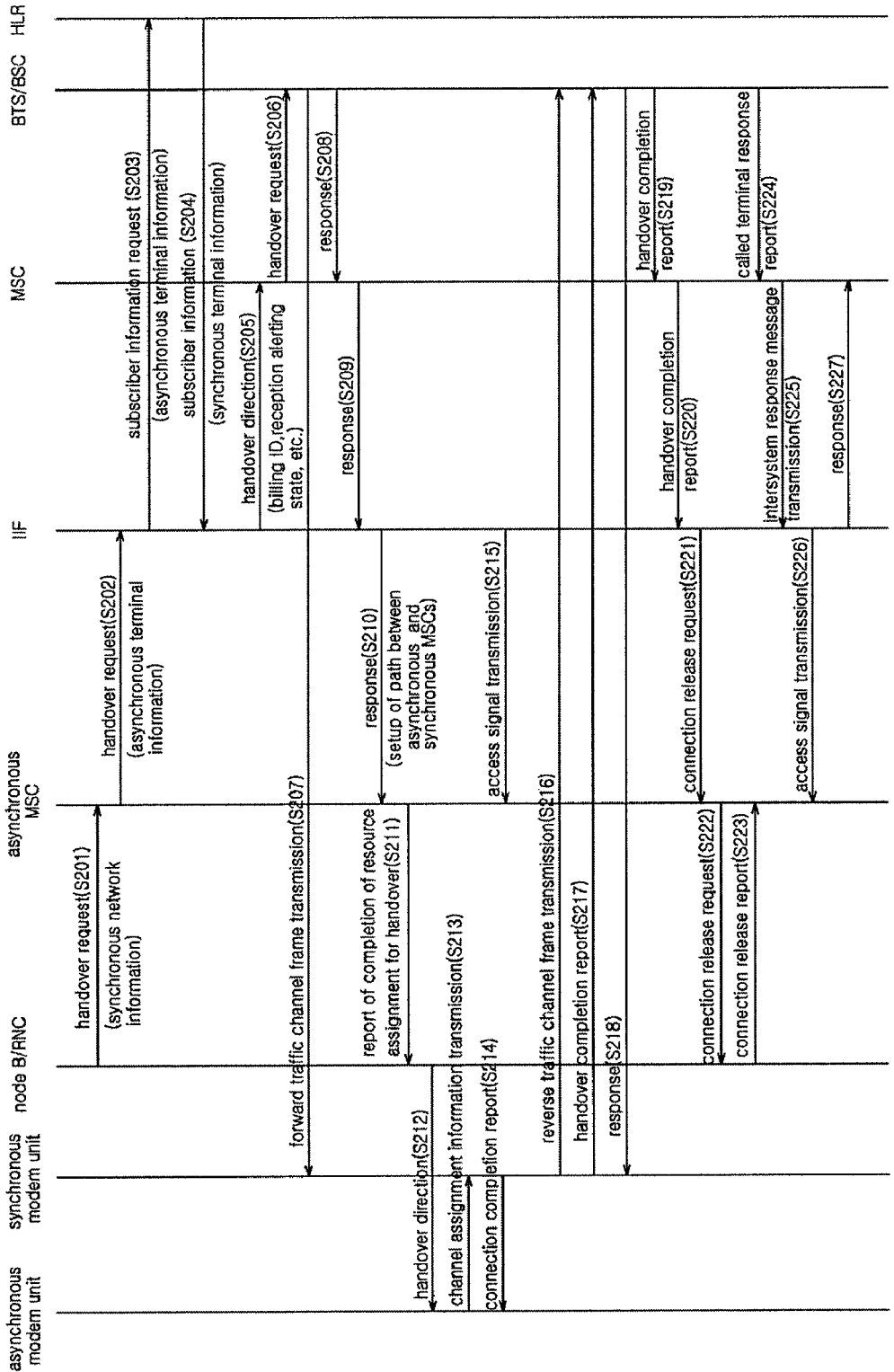

FIGS. 4 and 5 are a conceptual diagram and a flowchart, respectively, illustrating a method of handover between asynchronous and synchronous networks according to another embodiment of the present invention. The diagrams illustrate the handover method in the case where a mobile communication terminal moves to the area of a synchronous mobile communication system while in a reception alerting state in the area of an asynchronous mobile communication system.

For ease of description, the mobile communication terminals are classified as a calling mobile communication terminal 10*a* and a called mobile communication terminal 10*b*.

Referring to FIG. 4, the mobile communication terminals 10*a* and 10*b* periodically measure the strength of a signal from the currently connected node B of the asynchronous mobile communication system 20 and the strength of a signal from an adjacent BTS (or node B), and report the measured signal strengths to the node B. In response to the attempt of the calling mobile communication terminal 10a at call origination in the area A of the asynchronous mobile communication system 20, when the called mobile communication terminal 10b moves to an area C, overlapping the area B of the synchronous mobile communication system 30, in the case where the called mobile communication terminal 10b is in a reception alerting state via a node B/RNC 210, the node B requests handover from the asynchronous MSC 220 via the RNC if the strength of the signal from the node B reported by the mobile communication terminal 10b is equal to or lower than a preset value.

Accordingly, the process of performing the handover of the called mobile communication terminal 10b between the asynchronous mobile communication system 20 and the synchronous mobile communication system 30 is initiated via an IIF 60. When an asynchronous MSC 220 and a synchronous MSC 320 are connected to each other via the IIF 60 as a result of the completion of the handover, the reception alerting of the calling mobile communication terminal 10a causes the origination alerting of the called mobile communication terminal 10b via the BTS/BSC 310 of the synchronous mobile communication system 30.

The respective elements of the mobile communication terminal 10 and the mobile communication system, which are used to perform handover during the reception alerting, operate in a manner similar to that described in FIG. 2.

FIG. 5 is a flowchart illustrating a handover method that is performed during the reception alerting of the mobile communication terminal. Step S201 of the node B requesting handover from the asynchronous MSC via the RNC and step S223 of releasing the connection between the asynchronous MSC and the node B/RNC after the completion of the handover are similar to the corresponding steps in FIG. 3.

However, in the present embodiment, when the asynchronous MSC 220, having received a handover request message, transmits an asynchronous message (MAP Prep Handover Req) requesting handover to the IIF 60 at step S202, the asynchronous message further includes the CDMA calling mode parameters of FIG. 19, in addition to the parameters of FIG. 9, thereby indicating that the mobile communication terminal performing handover is in a reception alerting state.

Furthermore, in the present embodiment in addition to the fact that the IIF 60 transmits a handover direction message (Facilities Directive2) with a billing ID and an internal MSC circuit ID (InterMSCCircuit ID) for each handover section at step S205 of directing the synchronous MSC 320 to perform handover, the IIF 60 further includes information indicating that the mobile communication terminal performing handover is in a reception alerting state in the message, thereby causing a voice channel to be in a called state. For his purpose, one of the parameters of FIG. 11 that indicates a handover state is set as an identifier indicating a reception alerting state.

Meanwhile, when the called mobile communication terminal, having completed handover, makes a response after step S223 of the connection between the asynchronous MSC 320 and the node B/RNC 310 being released, the BTS/BSC 310 reports the response to the MSC 320 (using Connect) at step S224, and the MSC 320 provides notification of the response of the called mobile communication terminal by transmitting an Intersystem response message (Intersystem Answer) to the IIF 60 at step S225. Subsequently, the IIF 60 notifies the asynchronous MSC 220 of the response of the called mobile communication terminal by transmitting an access signal to the asynchronous MSC 220 at step S226 (MAP Process Access Signaling Req), and transmits a response message (Intersystem Answer Ack) for the intersystem response message to the MSC 320 at step S227.

The intersystem response message (Intersystem Answer), as illustrated in FIG. 20, includes parameters such as an internal MSC circuit ID, MIN and ESN.

A process of releasing a call after a mobile communication terminal in a reception alerting state in the asynchronous mobile communication system has completed handover to the synchronous mobile communication system according to the above-described process and the called mobile communication terminal has responded, thus initiating communication between a calling party and a called party, is as follows.

The call release may be requested from a subscriber's mobile communication terminal located in the area of the asynchronous mobile communication system, or from a subscriber's mobile communication terminal that has undergone handover to the area of the synchronous mobile communication system.

Although the call release request may be received from any party, the MSC 220 or 320, having received the call release request, transmits a call release request message (Facilities Release) to the IIF 60, and the IIF 60 responds to the call release request message (using Facilities Ack), so that a relay line set up between the MSCs is released. In this case, the call release request message (Facilities Release), as illustrated in FIG. 18, includes parameters, such as an internal MSC circuit ID, a release cause, a billing ID, and MIN, and its response message (Facilities Ack) includes parameters such as a billing ID.

In the present embodiment, as the mobile communication terminal in a reception alerting state in the asynchronous area moves to the area of the synchronous network, the RNC requests handover from the asynchronous MSC, and the asynchronous MSC determines whether the requested handover is handover within the asynchronous mobile communication system or handover to the synchronous mobile communication system. Furthermore, if it is determined that the requested handover is handover to the synchronous mobile communication system, messages are exchanged with the MSC of the synchronous mobile communication system using the IIF as a converter so as to accomplish the handover. In this case, notification of the fact that the handover target mobile communication terminal is in a reception alerting state is provided.

When the handover to the synchronous mobile communication system is completed and the mobile communication terminal placed in a reception alerting state responds, the synchronous MSC provides notification of the response of the mobile communication terminal to the alert by transmitting a system response message to the IIF, thereby completing the handover.

Figure 6:
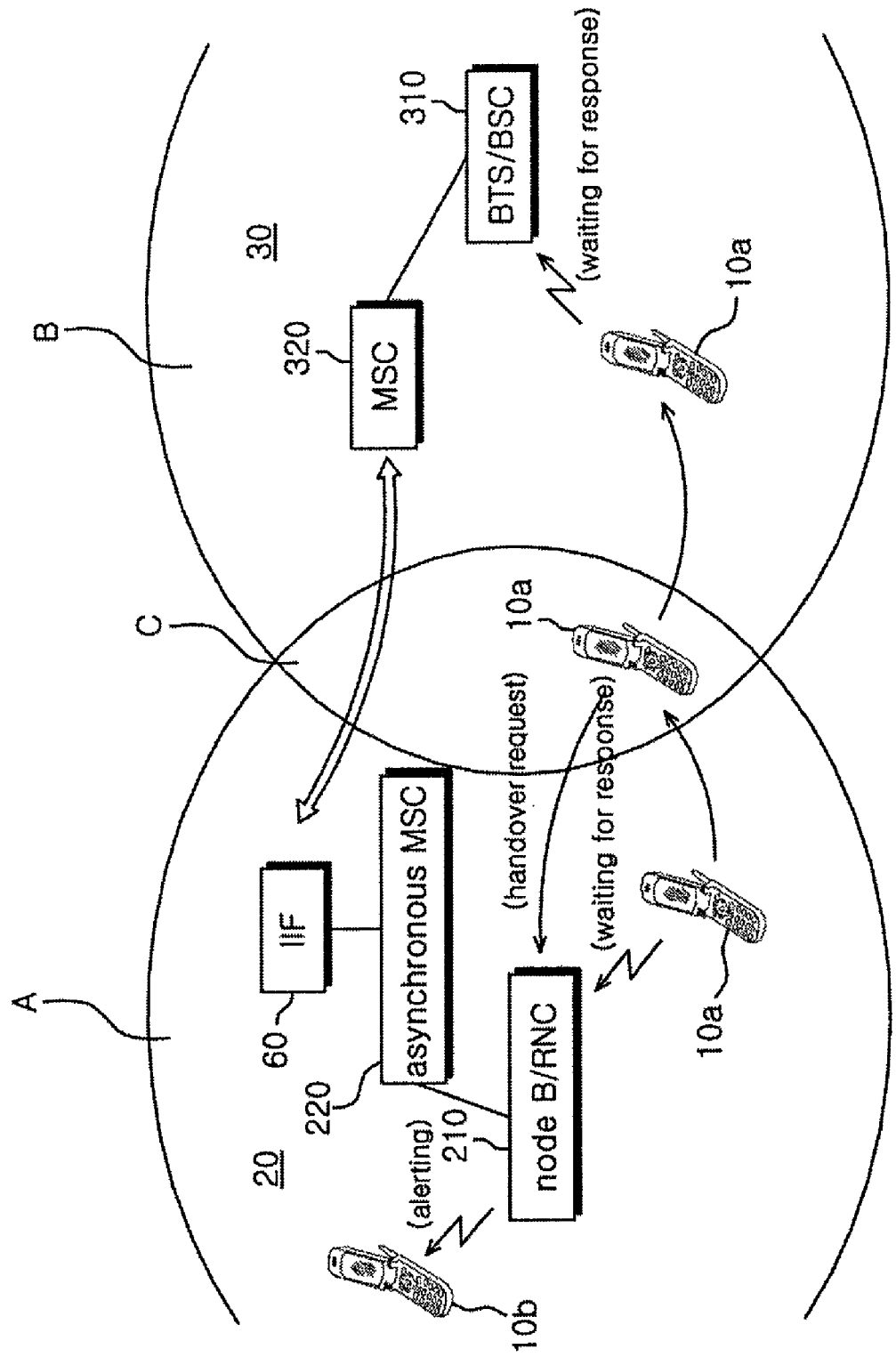
FIGS. 6 and 7 are a conceptual diagram and a flowchart, respectively, illustrating a method of handover between asynchronous and synchronous networks according to still another embodiment of the present invention.
Figure 7:
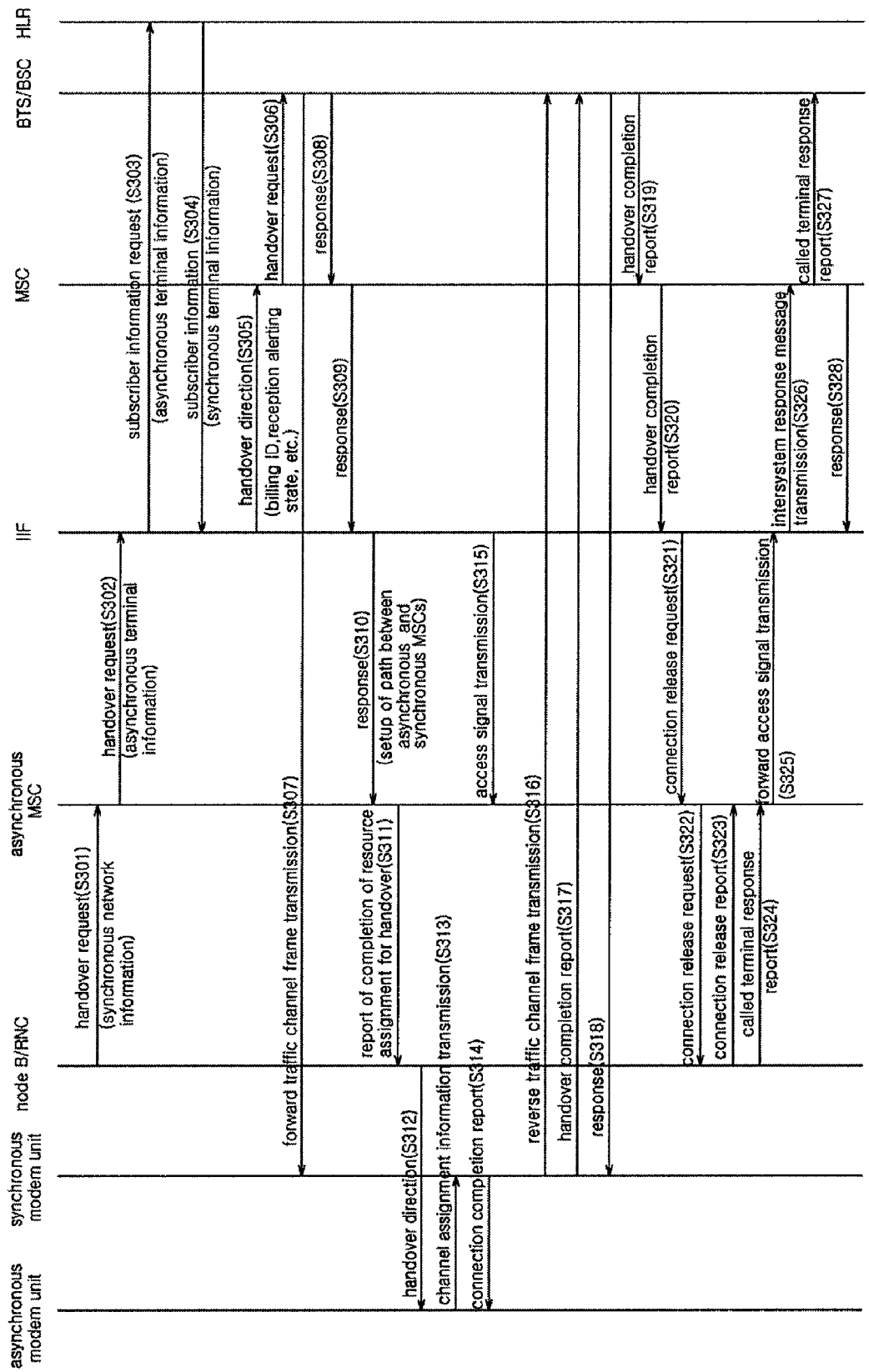

FIGS. 6 and 7 are a conceptual diagram and a flowchart, respectively, illustrating a method of handover between asynchronous and synchronous networks according to still another embodiment of the present invention. The diagrams illustrate the handover method in the case where a mobile communication terminal moves to the area of a synchronous mobile communication system while in the state of waiting for the response of a called party after the origination of a call in the area of an asynchronous mobile communication system.

For ease of description, the mobile communication terminals are classified as a calling mobile communication terminal 10a and a called mobile communication terminal 10b.

Referring to FIG. 6, the mobile communication terminals 10a and 10b periodically measure the strength of a signal from the currently connected node B of the asynchronous mobile communication system 20 and the strength of a signal from an adjacent BTS (or node B), and report the measured signal strengths to the node B. When the calling mobile communication terminal 10*a* moves to an area C, overlapping the area B of the synchronous mobile communication system 30, in the case where the called mobile communication terminal 10*b* is in a reception alerting state via a node B/RNC 210, due to the attempt of the calling mobile communication terminal 10*a* at call origination, in the area A of the asynchronous mobile communication system 20, the node B requests handover from the asynchronous MSC 220 via the RNC if the strength of the signal from the node B received from the mobile communication terminal 10*a* is equal to or lower than a preset value.

Accordingly, the process of performing handover of the calling mobile communication terminal 10*a* between the asynchronous mobile communication system 20 and the synchronous mobile communication system 30 is initiated via an IIF 60. When an asynchronous MSC 220 and a synchronous MSC 320 are connected to each other via the IIF 60 as a result of the completion of the handover, the calling mobile communication terminal 10*a* achieves a connection via the BTS/BSC 310 of the synchronous mobile communication system 30 and waits for a response from the called mobile communication terminal 10*b*.

The respective elements of the mobile communication terminal 10 and the mobile communication system, which are used to perform handover while waiting for a response to the origination of the call, operate in a manner similar to that described in FIG. 2.

FIG. 7 is a flowchart illustrating a handover method that is performed while waiting for a response to the origination of a call of the mobile communication terminal. Step S301 of the node B requesting handover from the asynchronous MSC via the RNC and step S323 of releasing the connection between the asynchronous MSC and the node B/RNC after the completion of the handover are similar to the corresponding steps of FIG. 3.

However, in the present embodiment, when the asynchronous MSC 220, having received a handover request message, transmits an asynchronous message (MAP Prep Handover Req) requesting handover to the IIF 60 at step S202, the asynchronous message further includes the CDMA calling mode parameters of FIG. 19, in addition to the parameters of FIG. 9, thereby indicating that the mobile communication terminal performing handover is in the state of waiting for a response to the origination of the call.

Furthermore, in the present embodiment, in addition to the fact that the IIF 60 transmits a handover direction message (Facilities Directive2) with a billing ID and an internal MSC circuit ID (InterMSCCircuit ID) for each handover section at step S205 of directing the synchronous MSC 320 to perform handover, the IIF 60 further includes information indicating that the mobile communication terminal performing handover is in the state of waiting for a response to the origination of a call. For this purpose, one of the parameters of FIG. 11 that indicates a handover state is set as an identifier indicating the state of waiting for a response to the origination of a call.

Meanwhile, when the called mobile communication terminal 10*b* makes a response after step S323 of the connection between the asynchronous MSC 320 and the node B/RNC 310 being released, the node B/RNC 310, to which the called mobile communication terminal 10*b* is connected, reports the response to the asynchronous MSC 220 at step S324 (using BICC or ISUP ANSWER), and the asynchronous MSC 220 transmits a forward access signal to the IIF 60 at step S325 (MAP Forward Access Signaling Req).

Accordingly, the IIF 60 detects the response of the called mobile communication terminal and transmits an intersystem response message (Intersystem Answer) to the synchronous MSC 320 at step S326. Thereafter, the synchronous MSC 320 reports the response of the called mobile communication terminal to the BSC/BTS 310 at step S327 (Progress), and transmits a response message (Intersystem Answer Ack) for the intersystem response message to the IIF 60 at step S328.

The intersystem response message (Intersystem Answer), as illustrated in FIG. 20, includes parameters such as an internal MSC circuit ID, MIN and ESN.

A process of releasing a call after the completion of the handover of the mobile communication terminal, which was in the state of waiting for a response in the asynchronous mobile communication system, to the synchronous mobile communication system, the response of the called mobile communication terminal, and the initiation of a call between a calling party and a called party according to the above-described process, is as follows.

The call release may be requested from a subscriber's mobile communication terminal located in the area of the asynchronous mobile communication system, or from a subscriber's mobile communication terminal that has performed handover to the area of the synchronous mobile communication system.

Although the call release request can be received from any party, the MSC 220 or 320, having received the call release request, transits a call release request message (Facilities Release) to the IIF 60, and the IIF 60 responds to the call release request message (using Facilities Ack), so that a relay line set up between the MSCs is released. In this case, the call release request message (Facilities Release), as illustrated in FIG. 18, includes parameters such as an internal MSC circuit ID, a release cause, a billing ID, and MIN, and its response message (Facilities Ack) includes parameters such as a billing ID.

In the present embodiment, as the mobile communication terminal, which is waiting for a response in the asynchronous area, moves to the area of the synchronous network, the RNC requests handover from the asynchronous MSC, and the asynchronous MSC determines whether the requested handover is handover within the asynchronous mobile communication system or handover to the synchronous mobile communication system. Furthermore, if it is determined that the requested handover is handover to the synchronous mobile communication system, messages are exchanged with the MSC of the synchronous mobile communication system using the IIF as a converter so as to accomplish the handover. In this case, notification of the fact that the mobile communication terminal being handed over is in the state of waiting for a response is provided.

When the handover to the synchronous mobile communication system is completed and the called mobile communication terminal responds, the synchronous MSC notifies the IIF of the response of the called mobile communication terminal. Accordingly, the IIF provides notification of the response of the called mobile communication terminal to alerting by transmitting an intersystem response message to the synchronous MSC, thereby completing the handover.

Those skilled in the art to which the above-described present invention pert can appreciate that the present invention can be implemented in other specific forms without change of the technical spirit or essential features. Therefore, it should be understood that the above-described embodiments are illustrative in all respects, but not restrictive. The scope of the present invention is defined by the attached claims, rather than the detailed description. It should be appreciated that the meaning and scope of the claims and of all variations and modifications thereof based on the concept of equivalence are included in the scope of the present invention.

INDUSTRIAL APPLICABILITY

As described above, the present invention allows handover to be achieved without the discontinuation of service in the case where an asynchronous mobile communication system overlaps a synchronous mobile communication system and a DBDM mobile communication terminal moves from the area of the asynchronous mobile communication system to the area of the synchronous mobile communication system, thereby overcoming the difference in service between the network generations and providing high-quality service.

Furthermore, it is not necessary to construct an asynchronous mobile communication system over an excessively wide area, so that the investment cost required for the design of the asynchronous mobile communication system can be reduced.

The invention claimed is:

1. A mobile communication system in which an asynchronous mobile communication system coexist with a synchronous mobile communication system, the asynchronous mobile communication system including a node B, a radio network controller (RNC) and an asynchronous Mobile Switching Center (MSC), and the synchronous mobile communication system including a Base Transceiver Station (BTS), a Base Station Controller (BSC) and a synchronous MSC, the mobile communication system enabling handover of a Dual Band Dual Mode (DBDM) mobile communication terminal and capable of communicating with the asynchronous and synchronous mobile communication systems, during voice communication, reception alerting, or waiting for a response after origination of a call, wherein:

the asynchronous and synchronous MSCs are connected to each other via an Interworking Interoperability Function (IIF), and are connected to a Dual stack Home Location Register (D-HLR);

the D-HLR configured to store and manage asynchronous subscription information and synchronous subscription information of the mobile communication terminal; and the IIF configured to store and manage synchronous mobile communication system information, receive the synchronous subscription information of the mobile communication terminal from the D-HLR at a request of the asynchronous MSC for handover, transmit the synchronous mobile communication system information and the synchronous subscription information of the mobile communication terminal to the synchronous MSC and receive a response from the synchronous MSC, thereby setting up a relay line between the asynchronous MSC and the synchronous MSC, and request the asynchronous MSC to release a wireless connection when the mobile communication terminal and the synchronous mobile communication system are connected to each other and notification of completion of the handover is provided by the synchronous MSC.

2. The mobile communication system as set forth in claim 1, wherein the RNC requests handover from the asynchronous MSC with adjacent BTS information included therein, and the asynchronous MSC determines whether the requested handover is handover within the asynchronous mobile communication system or handover to the synchronous mobile communication system at the request of the RNC for the handover.

3. The mobile communication system as set forth in claim 1, wherein the synchronous mobile communication system information stored in the IIF includes MSC information, a signaling point and handover target cell information, and the IIF create a billing ID, including an ID of an MSC to which the handover is performed, using the synchronous mobile communication system information.

4. The mobile communication system as set forth in claim 1, wherein the IIF transmits parameters, including a billing ID, ESN/MIN of the mobile communication terminal and an internal MSC circuit ID, to the synchronous MSC to set up the relay line between the asynchronous MSC and the synchronous MSC, and receives parameters, including synchronous channel data and a code channel list, from the synchronous MSC.

5. The mobile communication system as set forth in claim 1, wherein:

when handover of the mobile communication terminal, which is in a state of the reception alerting, is performed, the IIF receives the request for the handover and information indicating that the mobile communication terminal is in the state of the reception alerting from the asynchronous MSC; and after the handover of the mobile communication terminal placed in the state of the reception alerting has been completed, the IIF receives an intersystem response message from the synchronous MSC and notifies the asynchronous MSC of a response of the mobile communication terminal, which is in the state of the reception alerting, to the reception alerting.

6. The mobile communication system as set forth in claim 1, wherein:

when the handover of the mobile communication terminal waiting for the response after the origination of the call is performed, the IIF receives the request for the handover and information indicating that the mobile communication terminal is in a state of waiting for the response from the asynchronous MSC; and after the handover of the mobile communication terminal waiting for the response after the origination of the call has been completed, the IIF notifies the synchronous MSC of a response of a called mobile communication terminal by transmitting an intersystem response message as the IIF receives information about the response of the called mobile communication terminal.

7. A handover method for performing handover of a DBDM mobile communication terminal, capable of communicating with asynchronous and synchronous mobile communication systems, during voice communication, or reception alerting, or while waiting for a response after origination of a call in a mobile communication system in which the asynchronous mobile communication system coexist with the synchronous mobile communication system, the asynchronous mobile communication system including a node B, a radio network controller (RNC) and an asynchronous MSC, and the synchronous mobile communication system including a BTS, a BSC, and a synchronous MSC, the asynchronous and synchronous MSCs being connected to each other via an IIF, the asynchronous and synchronous MSCs being connected to a D-HLR, the method comprising the steps of:

the RNC transmitting a handover request message to the asynchronous MSC at a request of the mobile communication terminal for handover;

the asynchronous MSC transmitting the handover request message to the IIF;

the IIF requesting and receiving subscriber information of the mobile communication terminal from the D-HLR;

the IIF directing the synchronous MSC to perform the handover, and the synchronous MSC requesting the handover to the BSC/BTS;

the BTS/BSC assigning a forward traffic channel to the mobile communication terminal, and transmitting a response message for the request for the handover to the synchronous MSC;

the synchronous MSC transmitting a response message for a handover direction message to the IIF, and the IIF transmitting a response message for the handover request to the asynchronous MSC, thereby setting up a relay line between the asynchronous MSC and the synchronous MSC;

the asynchronous MSC reporting completion of assignment of resources for the handover by transmitting a resource assignment completion message to the RNC;

the RNC directing the mobile communication terminal to perform the handover via the node B;

the mobile communication terminal switching to a mode for connecting to the synchronous mobile communication system;

the IIF transmitting an access signal to the asynchronous MSC;

the mobile communication terminal transmitting frames and a preamble to the BTS/BSC via a reverse traffic channel and reporting completion of the handover to the BTS/BSC;

the BTS/BSC reporting the completion of the handover to the synchronous MSC, the synchronous MSC notifying the IIF of the completion of the handover; and the IIF requesting the asynchronous MSC to release a connection, and the connection between the asynchronous MSC and the node B/RNC being released.

8. The handover method set forth in claim 7, wherein the step of the RNC transmitting the handover request message to the asynchronous MSC comprises handover-related messages used in the synchronous mobile communication system, and parameters of adjacent cell information and adjacent BTS information of the mobile communication terminal, a handover type, a handover cause, a source BSC ID, a target BSC ID, RAB information and radio section-related information.

9. The handover method set forth in claim 8, further comprising the step of the asynchronous MSC determining whether the requested handover is handover within the asynchronous mobile communication system or handover to the synchronous mobile communication system with reference to the adjacent cell information and adjacent BTS information of the mobile communication terminal.

10. The handover method set forth in claim 7, wherein, at the step of the asynchronous MSC transmitting the handover request message to the IIF, an asynchronous ID number MSISDN of the mobile communication terminal is transmitted along with the handover request message.

11. The handover method set forth in claim 7, wherein the subscriber information received by the IIF from the D-HLR comprises a synchronous network identifier MIN and ESN of the mobile communication terminal.

12. The handover method as set forth in claim 7, wherein the step of the IIF requesting the subscriber information of the mobile communication terminal from the D-HLR uses any one of a synchronous message and an asynchronous message.

13. The handover method as set forth in claim 7, wherein the IIF creates a billing ID, which includes ID information of the synchronous MSC to be connected to the asynchronous MSC, prior to the transmission of the handover direction message to the synchronous MSC, transmits the handover direction message with the billing ID included therein, and transmits the handover direction message with an internal MSC circuit ID InterMSCCircuitID for each handover section included therein.

14. The handover method as set forth in claim 7, wherein the handover request message, which is transmitted by the IIF to the synchronous MSC, includes parameters including a billing ID, ESN, an internal MSC circuit ID and MIN, and the response message, which is transmitted by the synchronous MSC to the IIF, includes parameters including a CDMA channel data and a CDMA channel list.

15. The handover method as set forth in claim 7, wherein, at the step of the asynchronous MSC transmitting the resource assignment completion message to the RNC, the resource assignment completion message further comprises parameters including a message type, an RRC container, and an RAB list to be released.

16. The handover method as set forth in claim 7, wherein the access signal includes an invoke ID, an Application Protocol Data Unit (APDU) and selected radio resource information.

17. The handover method as set forth in claim 7, wherein:
after the step of releasing the connection between the asynchronous MSC and the node B/RNC,
as a call release request is received from a called or calling mobile communication terminal, the asynchronous or synchronous MSC, having received the call release request, transmits a call release request message to the IIF, and the IIF responds to the call release request message, thereby releasing the relay line set up between the asynchronous MSC and the synchronous MSC.

18. The handover method as set forth in claim 17, wherein the call release request message includes parameters including an internal MSC circuit ID, a release cause, a billing ID and MIN, and the response message includes parameters including a billing ID.

19. The handover method as set forth in claim 7, wherein, when the mobile communication terminal is in a state of the reception alerting state:
the step of the asynchronous MSC transmitting the handover request message to the IIF further comprises the step of providing notification of the mobile communication terminal being in the state of the reception alerting; and
the step of the IIF transmitting the handover direction message to the synchronous MSC further comprising the step of providing notification of the mobile communication terminal being in the state of the reception alerting;
further comprising, after the step of releasing the connection between the asynchronous MSC and the node B/RNC, the steps of:
as the mobile communication terminal in the state of the reception alerting responds to the reception alerting, the BTS/BSC notifying the synchronous MSC of a connection of the mobile communication terminal;
the synchronous MSC transmitting an intersystem response message to the IIF, and the IIF reporting the mobile communication terminal making the connection in response to the reception alerting to the asynchronous MSC; and
the IFF transmitting a response signal for the intersystem response message to the synchronous MSC.

20. The handover method as set forth in claim 7, wherein, when the mobile communication terminal is waiting for the response after the origination of the call:

the step of the asynchronous MSC transmitting the handover request message to the IIF further comprises the step of providing notification of the mobile communication terminal being in the state of waiting for the response; and the step of the IIF transmitting the handover direction message to the synchronous MSC further comprises the step of providing notification of the mobile communication terminal being in the state of waiting for the response, the method further comprising, after the step of releasing the connection between the asynchronous MSC and the node B/RNC, the steps of:

as a called mobile communication terminal responds, the asynchronous MSC notifying the IIF of a connection of the called mobile communication terminal;

the IIF transmitting an intersystem response message to the synchronous MSC, and the synchronous MSC reporting the mobile communication terminal making the connection in response to the origination to the BSC/BTS; and the synchronous MSC transmitting a response signal for the intersystem response message to the IIF.

21. The handover method as set forth in claim 19, wherein:

when the mobile communication terminal in the state of the reception alerting makes a response or a called party makes a response to the mobile communication terminal waiting for the response after the origination of the call, after the step of releasing the connection between the asynchronous MSC and the node B/RNC, as a call release request is received from a called or calling mobile communication terminal, the asynchronous or synchronous MSC, having received the call release request, transits a call release request message to the IIF, and the IIF responds to the call release request message, thereby releasing the relay line set up between the asynchronous MSC and the synchronous MSC.

22. The handover method as set forth in claim 21, wherein the call release request message includes parameters including an internal MSC circuit ID, a release cause, a billing ID and MIN, and a message through which the IIF responds to the call releasing request message includes parameters including a billing ID.

23. The handover method as set forth in claim 19, wherein the intersystem response message includes parameters including an internal MSC circuit ID, MN, and ESN.

* * * * *